United States Patent

[11] 3,593,814

[72] Inventor Fred W. Bauler
 6833 Creston Road, Minneapolis, Minn. 55435
[21] Appl. No 826,312
[22] Filed May 21, 1969
[45] Patented July 20, 1971

[54] SUPPORT AND RUNNING WHEELS FOR SNOWMOBILES
2 Claims, 4 Drawing Figs.

[52] U.S. Cl. .................................................. 180/5, 280/8, 280/28
[51] Int. Cl. ............................................. B62m 27/00
[50] Field of Search ................................. 180/5, 6, 3; 280/8, 12, 28; 244/108, 101

[56] References Cited
UNITED STATES PATENTS
Re.26,775 1/1970 Smieja ........................... 180/5
1,053,876 2/1913 Riley ............................. 280/3
2,449,336 9/1948 Spitzwieser ..................... 280/8 X
1,464,204 8/1923 Knowles ......................... 280/28
2,093,229 9/1937 Bowman ......................... 180/5 (A)

FOREIGN PATENTS
1,092,388 10/1954 France ........................... 244/108
6,264 5/1898 Norway .......................... 280/8
71,226 2/1931 Sweden .......................... 280/9

Primary Examiner—Richard J. Johnson
Attorney—Orrin M. Haugen

ABSTRACT: A running wheel for a vehicle having a steerable ski support runner, the running wheel being mounted adjacent the upper surface of the ski support runner, and extending through the ski for a distance adequate to provide running support; the running wheel having a beveled circumferential edge surface providing a relatively sharp ground surface-engaging edge.

PATENTED JUL 20 1971 3,593,814

INVENTOR.
FRED W. BAULER
BY
Orrin M. Haugen
ATTORNEY

SUPPORT AND RUNNING WHEELS FOR SNOWMOBILES

The present invention relates generally to running wheels for vehicles having a steerable ski support runner, and more specifically to a running wheel for a snowmobile, the running wheel having a beveled and relatively sharp ground surface-engaging edge.

Snowmobiles are designed primarily for controlled travel over snow covered fields and the like. In the ordinary and normal operation of these devices, the operator frequently finds it necessary to traverse relatively hard compacted areas of either ice or bare highway surfaces. Since the unit is designed for controlled travel through soft layers of snow, the devices frequently experience problems in traversing over ice or bare highway surfaces. Attempts have been made in the past to provide casters, running wheels, or the like, however these have not been entirely satisfactory since the vehicles frequently lose their directional control when operated in this fashion.

In accordance with the present invention, running wheels are provided which do not disturb the normal operation of the vehicle, and yet are readily available for use when necessary for engaging hard surfaces. The wheel is adapted to extend through an opening formed in the ski support runner, and the circumferential edge is beveled so as to provide a relatively sharp ground surface-engaging edge. The periphery of the wheel therefore provides a means for breaking through a crust of ice, and thereby provide directional stability to the unit, while at the same time providing a means for controlling the movement of the vehicle across bare highway surfaces.

Since the wheel is mounted so as to extend through the surface of the ski support runner, it will be appreciated that this wheel is constantly available for engaging the ground without need for retraction during periods of nonuse.

Therefore, it is an object of the present invention to provide an improved running wheel for snowmobiles having steerable ski support runners, the wheel extending through the surface of the ski runner and having a beveled circumferential edge surface which provides a relatively sharp ground surface-engaging edge.

It is a further object of the present invention to provide an improved running wheel for a snowmobile vehicle having a steerable ski support runner, the running wheel being available for providing support at all times, and not requiring retraction during periods of nonuse.

Other and further objects of the present invention will become apparent to those skilled in the art upon a study of the following specification, appended claims, and accompanying drawing, wherein:

Figure 1:
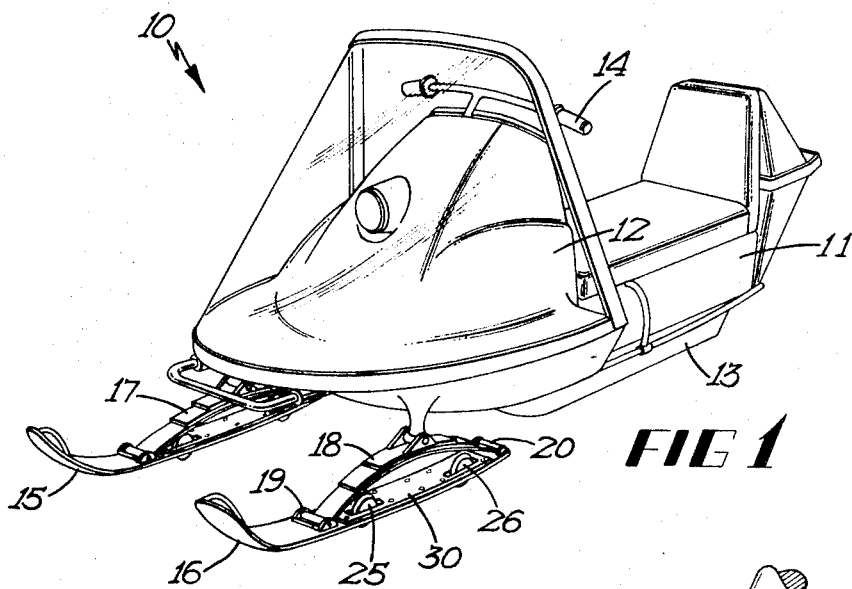
FIG. 1 is a perspective view of a snowmobile vehicle having a pair of steerable ski support runners equipped with running wheels prepared in accordance with the present invention.

In accordance with the preferred modification of the present invention, and with particular reference to FIG. 1, the snowmobile vehicle generally designated 10 includes a body 11 having an engine compartment 12, and a drive belt 13. Steering control such as the handlebars 14 are provided, the handlebars being coupled through a suitable linkage to the ski support runners 15 and 16. Leaf springs 17 and 18 are utilized to secure the ski support runners 15 and 16 respectively to the vehicle body 11, mounting shackles 19 and 20 being utilized to secure the spring such as the spring 18 to the ski support runner 16. The particular details of the basic vehicle, including the drive belt, steering mechanism, and the like is not a part of this invention, the invention consisting of the arrangement of the running wheels as is described hereinafter.

Figure 2:
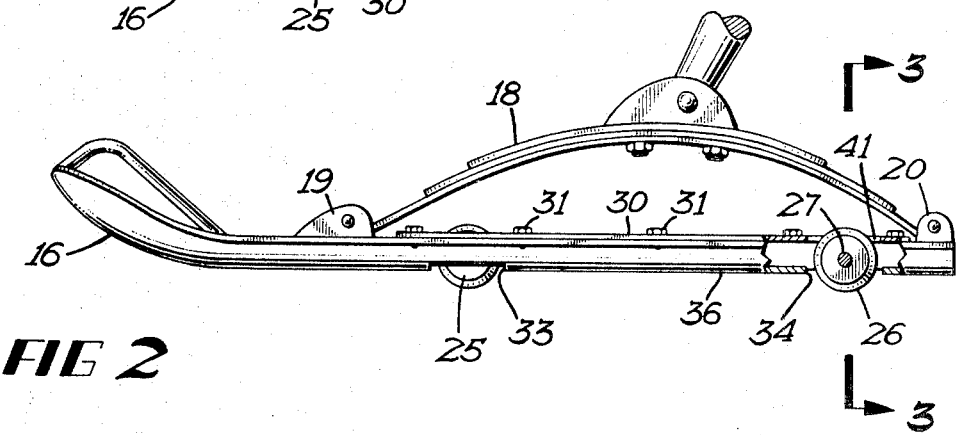
FIG. 2 is a detail elevational view, partially broken away, showing the mounting means employed for the improved running wheel of the present invention.
Figure 3:
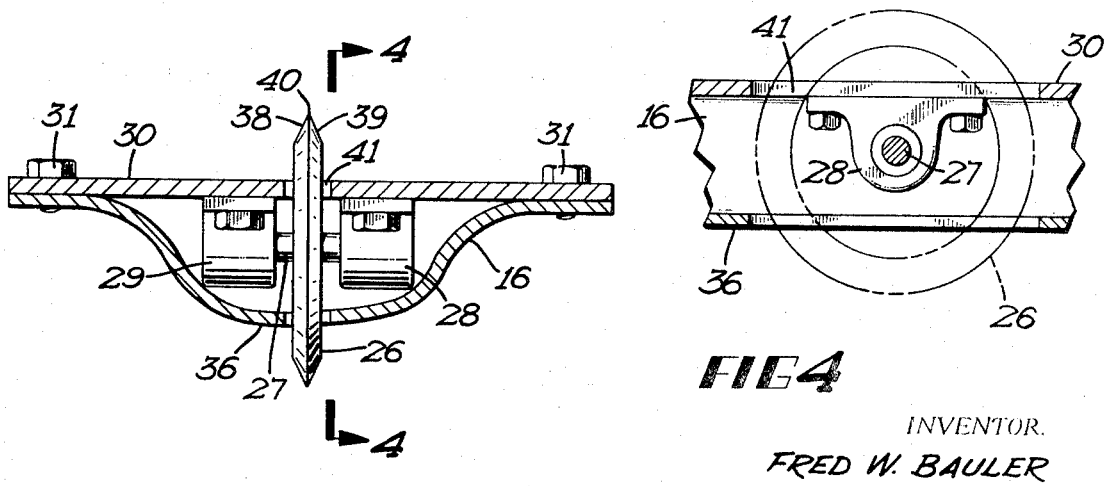
FIG. 3 is a vertical sectional view taken along the line and in the direction of arrows 3-3 of FIG. 2.
Figure 4:
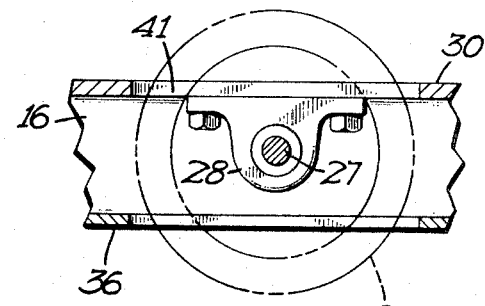
FIG. 4 is a detail elevational view showing a pillow block-mounting means utilized for retaining the running wheel in the ski support runner.

With particular attention being directed to FIG. 2 of the drawing, a pair of running wheels are provided as at 25 and 26, these wheels being mounted on axle shaft means such as the axle shaft 27. As indicated in FIGS. 3 and 4, pillow blocks or the like as at 28 and 29 may be utilized for securing the running wheel to the ski support runner along mounting plate 30. As indicated in FIG. 3, mounting plate 30 is coupled or secured to the ski support runner 16 by means of mounting bolts or the like 31–31. The pillow blocks 28 and 29 are likewise secured to the plate 30 by means of bolts, as indicated. Obviously, other mounting schemes may be employed such as, for example, welding or the like without departing from the aspects of this invention.

The running wheels 25 and 26 extend through openings 33 and 34 formed in the surface of the ski support runner 16, and a portion of the running wheel extends through these openings. In this connection, the axle shaft is mounted at a point from the lower running surface 36 of ski support runner 16 by a distance less than the radius of the running wheel 26.

With particular attention now being directed to the configuration of the wheel 26, it will be observed that the running wheel has beveled circumferential edge surfaces as at 38 and 39, this providing a relatively sharp ground surface-engaging edge as at 40. Thus, with this edge being available, any icy surface will be broken by the sharp contacting edge, thus providing continued steerable support for the ski. As is indicated in FIGS. 1 and 2, the individual ski support runners are each provided with a pair of aligned running wheels, these wheels being situated along the central axis of the ski support runner.

While the runner wheels 25 and 26 may be fabricated from any desirable material of construction, steel is generally preferred for its durability, and also for its capability of being sharpened, when necessary.

The individual running wheels 25 and 26 extend through the ski in the area of openings 33 and 34, it being shown in FIG. 3 that the openings are just slightly larger than the axial thickness of the individual wheels. This is to prevent continuous movement of soft snow trough the openings, which could disturb the ordinary operation of the device. Also, as is shown in FIGS. 3 and 4, the plate 30 is provided with an opening as at 41 for permitting the edges of the wheel 26 to extend therethrough.

What I claim is:

1. A running wheel for a vehicle having a steerable ski support runner comprising, in combination:
   a. a running ski with an elongated axis having an upper surface and a lower running surface;
   b. means for controllably turning the ski about a turning pivot axis;
   c. plate means secured to said upper surface and having a pair of disc-shaped running wheel and axle shaft means secured thereto and mounting said running wheel and axle shaft means adjacent said upper surface for supporting said running wheel for axial rotation about an axis normal to said elongated axis, said axle shaft means being secured to the undersurface of said plate and being spaced from said running surface a distance less than the radius of said running wheel with said wheels being disposed along the central axis of said ski support runner;
   d. openings formed through said running ski and being adapted to receive said running wheels therethrough; and
   e. said running wheels having beveled circumferential edge surfaces providing a relatively sharp ground surface-engaging edge.

2. The combination as defined in claim 1 being particularly characterized in that said running wheels are fabricated from steel.